(12) United States Patent
Quadri et al.

(10) Patent No.: US 11,098,867 B2
(45) Date of Patent: Aug. 24, 2021

(54) LIGHT FIXTURE AND METHOD FOR OPERATING SAID LIGHT FIXTURE

(71) Applicants: OSRAM GmbH, Munich (DE); CLAY PAKY S.p.A., Seriate (IT)

(72) Inventors: Aris Quadri, Seriate (IT); Andreas Huber, Maisach (DE)

(73) Assignees: OSRAM GMBH, Munich (DE); CLAY PAKY S.P.A., Seriate (IT)

( * ) Notice: Subject to any disclaimer, the term of this patent is extended or adjusted under 35 U.S.C. 154(b) by 0 days.

(21) Appl. No.: 16/831,832

(22) Filed: Mar. 27, 2020

(65) Prior Publication Data

US 2020/0309334 A1  Oct. 1, 2020

(30) Foreign Application Priority Data

Mar. 29, 2019  (IT) .......................... 102019000004793

(51) Int. Cl.
*F21S 10/00* (2006.01)
*F21W 131/406* (2006.01)

(52) U.S. Cl.
CPC ...... *F21S 10/007* (2013.01); *F21W 2131/406* (2013.01)

(58) Field of Classification Search
CPC ....... F21S 10/007; F21S 10/023; F21S 10/066
See application file for complete search history.

(56) References Cited

U.S. PATENT DOCUMENTS

| 5,045,983 A * | 9/1991 | Shields ................ H05B 47/155 362/293 |
| 5,113,332 A * | 5/1992 | Richardson ............... F21V 9/40 362/282 |
| 8,206,008 B2 * | 6/2012 | Quadri .................. F21S 10/007 362/282 |

(Continued)

FOREIGN PATENT DOCUMENTS

| GB | 2231138 A | 11/1990 |
| WO | 2013150441 A1 | 10/2013 |
| WO | 2017054823 A1 | 4/2017 |

OTHER PUBLICATIONS

European Search Report issued for the corresponding EP application No. 20 16 6505, dated May 20, 2020, 9 pages (for informational purpose only).

(Continued)

*Primary Examiner* — Alexander K Garlen
(74) *Attorney, Agent, or Firm* — Viering, Jentschura & Partner MBB (57) ABSTRACT

A light fixture may include a light source assembly configured to generate visible light radiation of different colours, an optical device configured to process at least a portion of the light radiation emitted by the light sources so as to form a light beam extending substantially along an optical axis, and at least one beam processing element located downstream of the optical device and configured to selectively intercept the light beam. The beam processing element may include at least one portion movable between several posi- (Continued)

tions. The light fixture may include a control device configured to control the light source assembly either on the basis of the position of a movable portion of the beam processing element or on the basis of a parameter correlated to the position of the movable portion of the beam processing element.

14 Claims, 5 Drawing Sheets

(56) References Cited

U.S. PATENT DOCUMENTS

| | | |
|---|---|---|
| 2012/0230013 A1 | 9/2012 | Xu |
| 2013/0003368 A1 | 1/2013 | Li et al. |
| 2013/0058095 A1* | 3/2013 | Outland ................ F21S 10/007 362/283 |
| 2015/0176813 A1* | 6/2015 | De Vaan .............. G02B 26/008 362/84 |
| 2016/0069540 A1* | 3/2016 | Kjeldsen ................ F21V 5/007 362/232 |
| 2016/0369961 A1* | 12/2016 | Barham ................ F21V 14/06 |
| 2017/0191631 A1* | 7/2017 | Lentine ..................... F21V 5/04 |
| 2018/0283632 A1* | 10/2018 | Rasmussen ............. F21V 13/02 |
| 2019/0346100 A1* | 11/2019 | Kildeby ................. F21V 13/00 |

OTHER PUBLICATIONS

Italian search Report issued for corresponding IT—Application No. 102019000004793, dated Dec. 4, 2019, 7 pages (for informational purpose only).

* cited by examiner

| FIG. 7a | FIG. 7b | FIG. 7c | FIG. 7d |

| FIG. 8a | FIG. 8b | FIG. 8c | FIG. 8d | ns of the light beam emitted by the light fixture in the operating
LIGHT FIXTURE AND METHOD FOR OPERATING SAID LIGHT FIXTURE

CROSS-REFERENCE TO RELATED APPLICATIONS

This patent application claims priority from Italian patent application no. 102019000004793 filed on Mar. 29, 2019, the entire disclosure of which is incorporated herein by reference.

TECHNICAL FIELD

This invention relates to a light fixture, such as a light fixture for stage, and a method for operating said light fixture.

BACKGROUND

Light fixtures are used in the entertainment industry to create scenographic effects using light beams.

The entertainment industry is always looking for new scenographic effects, obtained by means of light fixtures that are increasingly powerful and high performing and, at the same time, easy and economical to produce.

SUMMARY

In accordance with these purposes, a light fixture, such as a light fixture for stage, may be able to generate new scenographic effects and which, at the same time, is high performing and easy and economical to produce.

According to these purposes, a light fixture may include:
- at least one light source assembly configured to generate visible light radiation of different colours;
- an optical device configured to process at least a portion of the light radiation emitted by the light source assembly so as to form a light beam extending substantially along an optical axis;
- at least one beam processing element located downstream of the optical device and configured to selectively intercept the light beam; the beam processing element comprising at least one portion that is movable between several positions;
- a control device configured to control the light source assembly either on the basis of the position of the movable portion of the beam processing element or on the basis of a parameter correlated to the position of the movable portion of the beam processing element.

Thanks to this type of light source assembly control, it is possible to obtain innovative scenographic effects never before obtained by known art light fixtures. The combinations that can be obtained, in terms of the projected beam's forms and colours, are countless. Such combinations can be modified simply by controlling the light source assembly without the need to include specific devices within the light fixture, which would increase its size and cost.

According to a non-limiting embodiment, the light source assembly comprises at least two light sources, which are configured to generate visible light radiation of different colours.

According to a non-limiting embodiment, the beam processing element comprises at least one portion rotating about a respective axis of rotation; the control device being configured to control the light source assembly on the basis of the angular position of the portion of the beam processing element.

According to a non-limiting embodiment, the portion is rotatable at a speed of at least 25 rps. In this way, it is possible to take advantage of the persistence of the retinal image to obtain special scenographic effects.

According to a non-limiting embodiment, the light fixture comprises at least one step motor configured to move the portion of the beam processing element; the control device being configured to control the light source assembly on the basis of the angular position of the step motor. In this way, it is possible to use a parameter correlated to the actual position of the movable portion that can be detected more easily.

According to a non-limiting embodiment, the control device is configured to control at least one of the light sources of the light source assembly either on the basis of the position of the movable portion of the beam processing element or on the basis of a parameter correlated to the position of the movable portion of the beam processing element.

According to a non-limiting embodiment, the control device is configured to control the activation of each light source and/or the intensity of the light radiation emitted by each light source. In this way, it is possible to obtain beams wherein the light intensity and the colour of the beam can be adjusted as desired. This enables scenographic effects to be obtained wherein the projected beam has particular colour effects, etc.

According to a non-limiting embodiment, the beam processing element is a gobos device. In this way, it is possible to obtain special effects wherein portions of the beam can have different forms and colours.

According to a non-limiting embodiment, the portion rotating about a respective axis of rotation is a gobos-holder disc or a gobo.

A method may also be provided for operating a light fixture in order to generate particular and innovative scenographic effects.

BRIEF DESCRIPTION OF THE DRAWINGS

Further advantageous embodiments and developments of the component emerge from the various embodiments described below in conjunction with the figures.

Elements which are the same or of the same type, or which have the same effect, are provided with the same references in the figures.

DETAILED DESCRIPTION

Figure 1:
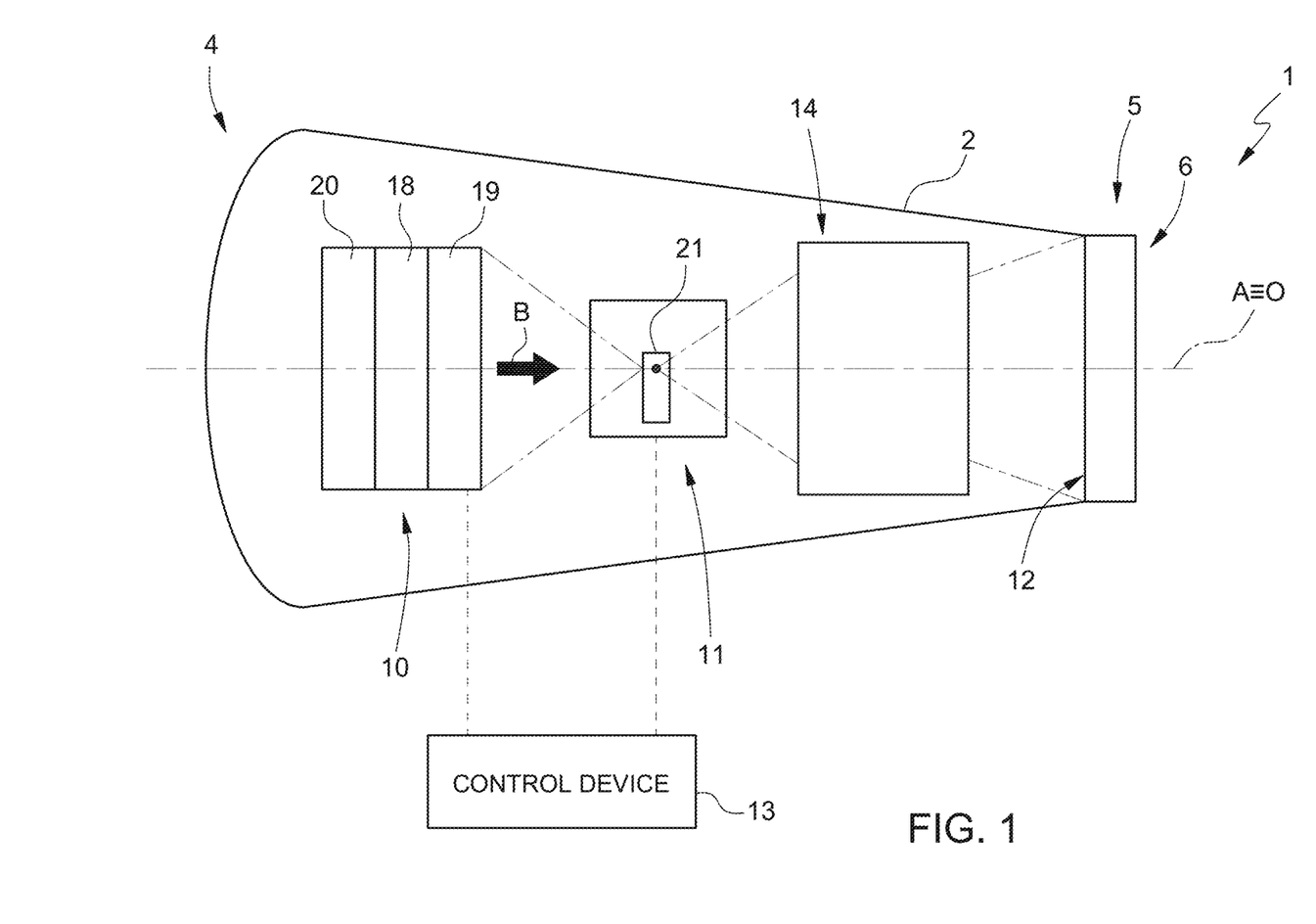
FIG. 1 is a schematic view, with some parts shown in cross-section and some removed for clarity, of a light fixture.

In FIG. 1, reference numeral 1 indicates a light fixture, such as for stage.

The light fixture 1 comprises a housing 2 and support means (not shown in the accompanying figures) configured to support the housing 2. The support means are configured to move the housing 2 and to enable the housing 2 to rotate about two orthogonal axes, commonly known as PAN and TILT. The operation of the support means is adjusted by a movement control device (not visible in the accompanying figures). The movement control device may also be managed remotely, such as using the DMX communication protocol. According to a variant, the support means may be configured just to support the housing 2 without being able to move it.

The housing 2 extends along a longitudinal axis A and is provided with a first closed end 4 and a second end 5, opposite the first closed end 4 along the axis A, and provided with a projection hole 6. In the non-limiting example described and shown herein, the projection hole 6 has a substantially circular cross-section. The projection hole 6 is centred on the axis A of the housing 2.

The light fixture 1 also comprises a frame (not visible in the accompanying figures) coupled to the housing 2, a light source assembly 10, at least one beam processing assembly 11, at least one first optical assembly 12, and a control device 13. The beam processing assembly 11 is located between the light source assembly 10 and the first optical assembly 12.

In the non-limiting example described and shown herein, the light fixture 1 comprises, in addition, at least a second optical assembly 14 located between the beam processing assembly 11 and the first optical assembly 12.

The light source assembly 10, the beam processing assembly 11, the first optical assembly 12, the second optical assembly 14 are schematically shown in FIG. 1.

The frame is integral with the housing 2 and comprises a plurality of elements coupled to one another and configured to define a support structure for the components located within the housing 2, namely the light source assembly 10, the beam processing assembly 11, the first optical assembly 12, and the second optical assembly 14.

The light source assembly 10 is located within the housing 2 at the closed end 4 of the housing 2 and is supported by the frame.

The light source assembly 10 is configured to generate a light beam.

The light source assembly 10 is configured to generate light radiation of different colours. In the non-limiting example described and shown herein, the light source assembly 10 comprises a plurality of light sources 18 (schematically represented by a block) designed to emit light beams mainly along an emission direction B, an optical device 19 (schematically represented with a block), and a cooling device 20 configured to cool the light sources 18 (schematically represented by a block). "Emission direction" means the direction towards which the greatest amount of the light beam, emitted by the light sources 18 of the light source assembly 10, propagates. In the non-limiting example described and shown herein, the light source assembly 10 comprises at least two light sources 18, which are configured to generate visible light radiation of different colours.

In other words, at least two light sources 18 are configured to generate light beams that have different emission spectra.

In the non-limiting example described and shown herein, there are three light sources 18 and they are RGB (Red Green Blue) sources.

The light sources 18 can be of the LED type or they may comprise laser diodes of different colours.

According to one variant, the light source assembly 10 may also comprise at least one LARP (Laser Activated Remote Phosphor) type source connected to a phosphor wheel to enable the colour of the light radiation emitted by the LARP source to be varied.

Other variants require that the light source assembly 10 comprise halogen or discharge lamps.

The light source assembly 10 is adjustable using the control device 13.

In particular, each of the light sources 18 is adjustable independently of the control device 13.

In particular, the control device 13 may adjust the activation of each source 18 and/or the intensity of the light radiation emitted by each source 18 and/or the modulation of the light radiation emitted by each source 18 and/or the colour of the light radiation emitted by each source 18 and/or the duty-cycle of each light source 18 and/or the polarisation of the radiation emitted by each light source 18.

The control device 13 may also adjust parameters and elements of the optical device 19 located downstream of the light sources 18.

The control device 13 may also make adjustments to one light source 18 correlated to the conditions of at least one other light source assembly 10 light source 18. For example, the control device 13 may make adjustments based on position relationships or curves defined by the International Commission on Illumination (Commission Internationale de l'Eclairage, CIE) and/or on the complementarity of colours emitted by light sources 18.

The optical device 19 is located downstream of light sources 18 along the emission direction so as to intercept the light beam emitted by the light sources 18 and is configured to conveniently process the light beams emitted by the light sources 18 and to generate a single light beam along an optical axis O. In more detail, the optical device 19 is configured to process at least a portion of the light radiation emitted by the light sources 18 so as to form a light beam extending substantially along the optical axis O.

The optical device 19 is configured to concentrate the beam on a given point (called the point of focus).

In the non-limiting example described and shown herein, the optical axis O coincides with the axis A of the housing 2.

The optical device 19 may comprise optical assemblies such as zoom, focus, filters, polarisers, condensers, or mixers, etc.

The beam processing assembly 11 is located downstream of the light source assembly 10 and comprises at least one beam processing element 21, which is configured to process the light beam emitted by the light source assembly 10 so as to obtain one or more scenographic effects. In particular, the beam processing element 21 is supported and/or configured so as to selectively intercept the light beam in order to only modify the light beam when needed.

The beam processing assembly 11 comprises a plurality of beam processing elements 21.

The position of each of the beam processing elements 21 is adjusted by the control device 13.

Figure 2:
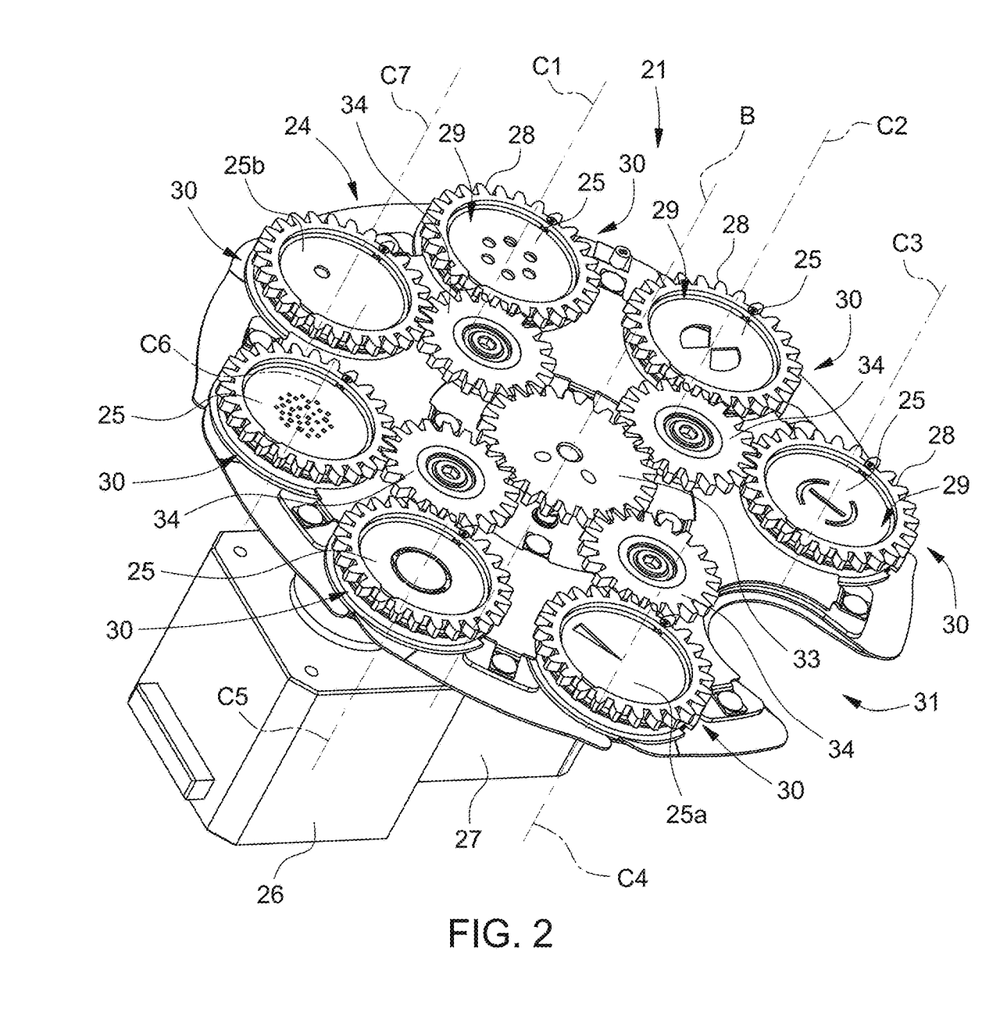
FIG. 2 is a perspective view of a detail of the light fixture in FIG. 1.

In the non-limiting example described and shown herein, at least one beam processing element 21 is a gobos device (schematically shown in FIG. 1 and more clearly visible in FIG. 2).

The beam processing assembly 11 may also comprise an additional gobos device and/or a frost assembly and/or a prismatic element (not shown in the attached figures for simplicity) and/or an optical assembly and/or a zoom device, etc.

It should be understood that the beam processing assembly 11 may comprise additional beam processing elements that are not listed here.

The beam processing assembly 11 is configured to selectively position one of the beam processing elements 21 at the point of focus under the control of the control device 13.

In the non-limiting example described herein and shown in FIG. 1, the gobos device 21 is positioned on a focal plane of the light beam emitted by the light source assembly 10.

The first optical assembly 12 is a lens optical assembly, such as located at the projection hole 6 so as to be a final output optical assembly. The second optical assembly 14 is a zoom optical assembly.

With reference to FIG. 2, the gobos device 21 comprises at least one gobos-holder disc 24, at least one gobo 25, a first motor 26 configured to move the gobos-holder disc 24 and a second motor 27 configured to move the gobo 25.

In the non-limiting example described and shown herein, the gobos device 21 comprises a plurality of gobos 25, in this case seven.

The term "gobo" designates a disc, typically made of stainless steel or glass, wherein a pattern or shape is cut out in order to create a light design when the gobo intercepts a light beam.

The gobos device 21 is, therefore, configured to selectively arrange a gobo 25 in a position wherein it intercepts the light beam in order to obtain a certain scenographic effect.

The gobos-holder disc 24 rotates about a central axis of rotation B and is moved by the first motor 26. In the non-limiting example described and shown herein, the axis of rotation B is parallel to the optical axis O.

The gobos-holder disc 24 can rotate in both directions.

The gobos-holder disc 24 comprises a plurality of gobos supports 28, in this case seven gobos supports 28, each of which has a housing slot 29 for a respective gobo 25, and a plurality of slots 30 distributed along a circular path around the axis B. In this case, the gobos-holder disc 24 has seven slots 30, each of which is designed to house a respective gobos support 28, and an opening 31 designed to enable the free passage of the light beam.

The gobos supports 28 can be coupled so that they slide in a direction lying on a plane perpendicular to the axis B and are mutually lockable by means of a reversible locking mechanism to keep the gobos support 28 in a specific position in the respective slot 29.

The gobos supports 28 rotate about the respective axes of rotation C1-C7, so that the respective gobos rotate about the respective axes of rotation C1-C7.

The gobos supports 28 are provided with a toothed outer edge.

The gobos-holder disc 24 comprises a central gear wheel 33, which is coupled to the second motor 27 and rotates about the axis B independently of the gobos-holder disc 24, a plurality of intermediate gear wheels 34, each of which engages the central wheel 33, and the toothed outer edge of at least one gobos support 28.

Basically, in use, the rotation of the central gear wheel determines the rotation of all the gobos 25.

The second motor 27 is a step motor.

The transmission ratio depends on the configuration of the central gear wheel 33, the intermediate wheels 34, and the toothing of the outer edge of the gobo supports 28.

With reference to FIG. 1, the control device 13 is configured to adjust the light sources 18 on the basis of the position of at least one beam processing element 21.

In the non-limiting example described and shown herein, the control device 13 is configured to adjust the light sources 18 on the basis of the angular position of the gobo 25 of the gobos device 22 intercepting the light beam.

In one variant not shown, the control device 13 adjusts the light sources 18 on the basis of the angular position of the second motor 27.

In one variant not shown, the control device 13 adjusts the light sources 18 on the basis of the angular position of the gobos-holder disc 24.

In another variant not shown, the control device 13 adjusts the light sources 18 on the basis of the position of a beam processing element 21, e.g. on the basis of the angular position of a prismatic element.

The control device 13 may also be managed remotely, such as using the DMX protocol communications.

Figure 3:
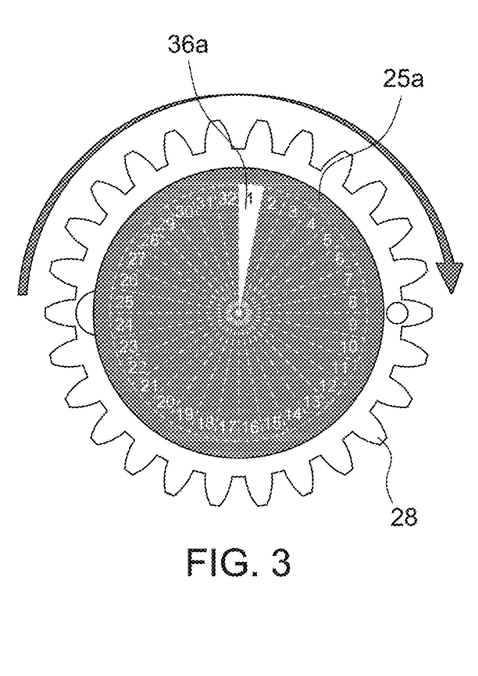
FIG. 3 is a schematic view of an additional detail of the light fixture in FIG. 1.

FIG. 3 shows a gobo 25a coupled to the respective gobos support 28. In the gobo 25a there is a shape 36a in the form of a circular sector.

The dashed lines represent the angular positions that the gobo 25a and the shape 36a can assume, in use.

Figures 4A, 5A:
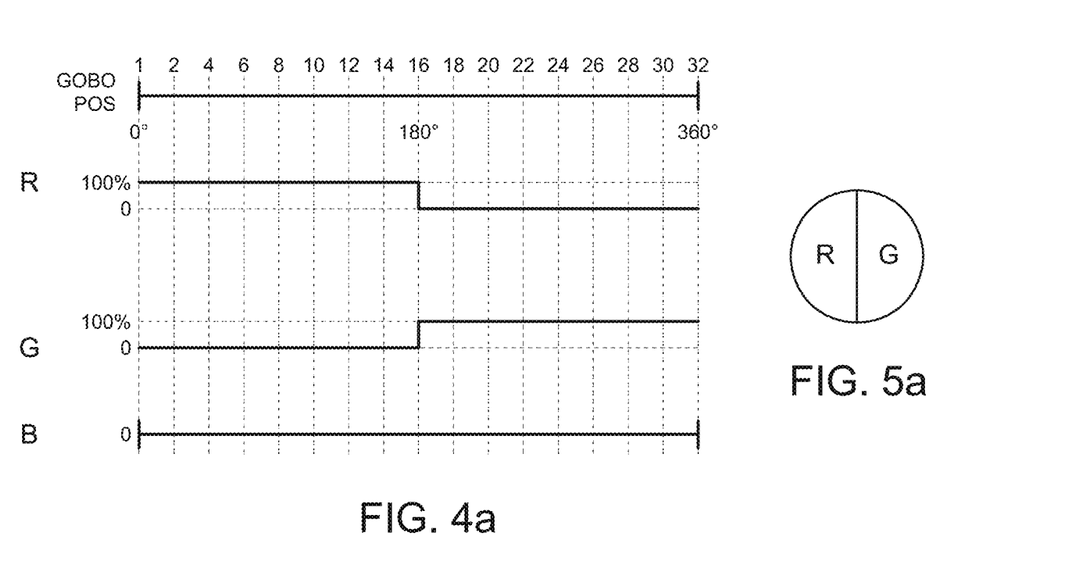
FIGS. 4a, 4b, 4c, 4d show schematic diagrams relating to the trend of certain variables in the respective different operating configurations of the light fixture.
FIGS. 5a, 5b, 5c, 5d schematically show the projections of the light beam emitted by the light fixture in the operating configurations of FIGS. 4a, 4b, 4c, and 4d, respectively.

FIG. 4a shows on the same graph three diagrams respectively related to the trend of the light intensity signal of the red source (R), the green source (G), and the blue source (B) in relation to the angular position of the gobo 25a in FIG. 3.

The adjustment shown in FIG. 4a determines the projection of a light beam shown in FIG. 5a and provided with two circular sectors of different colours (in more detail, a red sector R and a green sector G).

The projection effect of separate circular sectors is obtained thanks to the fact that the rotation speed of the gobo 25a is such that the rotation of the gobo 25a itself is not perceptible to the human eye. In other words, the persistence of the retinal image is taken advantage of to obtain special scenographic effects.

The rotation speed of the gobo 25a is higher than 25 rps (1500 rpm). In the non-limiting example described and shown herein, the rotation speed of the gobo 25a is 33.3 rps (2000 rpm).

Figures 4B, 5B:
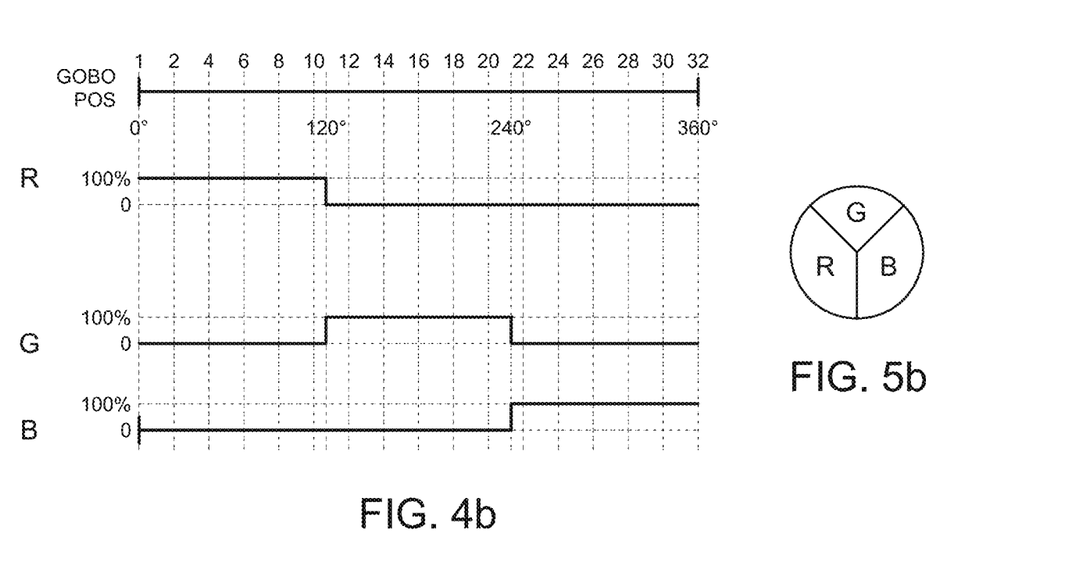

FIG. 4b shows a second example of an adjustment of the light intensity of the red source (R), the green source (G), and the blue source (B) in relation to the angular position of the gobo 25a in FIG. 3 that rotates at the rotation speed indicated above.

The adjustment shown in FIG. 4b determines the projection of a light beam shown in FIG. 5b and provided with three circular sectors of different colours (in more detail, a red sector R, a green sector G, and a blue sector B).

Figure 4C:
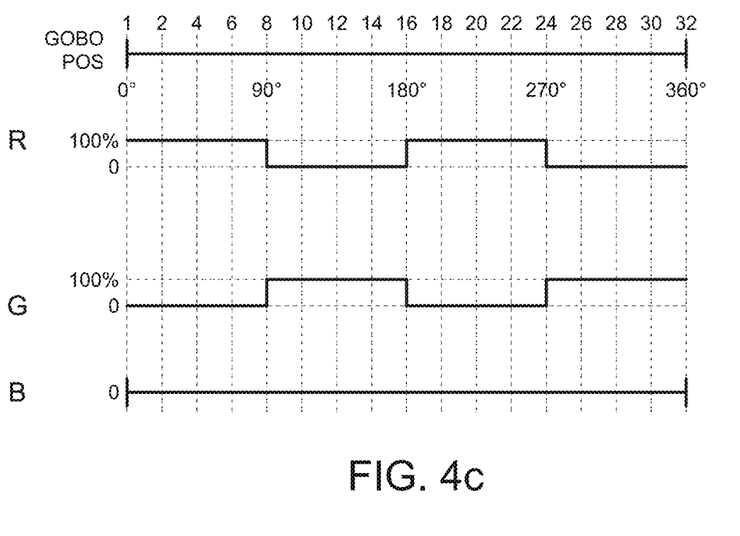

FIG. 4c shows a third example of an adjustment of the light intensity of the red source (R), the green source (G), and the blue source (B) in relation to the angular position of the gobo 25a in FIG. 3.

Figure 5C:
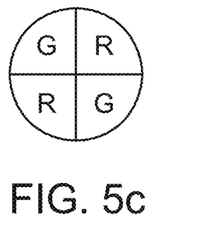

The adjustment shown in FIG. 4c determines the projection of a light beam shown in FIG. 5c and provided with four circular sectors of different colours (in more detail, four circular sectors alternating between the colours red R and green G).

Figure 4D:
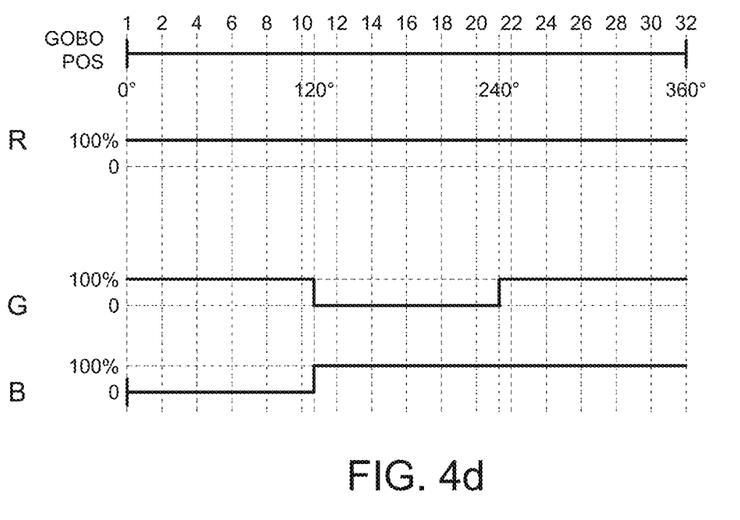

FIG. 4d shows a fourth example of an adjustment of the light intensity of the red source (R), the green source (G), and the blue source (B) in relation to the angular position of the gobo 25a in FIG. 3.

Figure 5D:
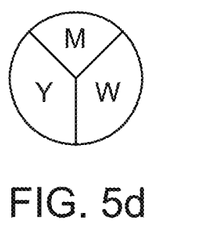

The adjustment shown in FIG. 4d determines the projection of a light beam shown in FIG. 5d and provided with three circular sectors of different colours: a yellow sector Y (obtained by mixing the colours red R and green G), a magenta sector M (obtained by mixing the colours red R and blue B), and a white sector W (obtained by mixing the colours red R, green G, and blue B).

Adjusting the intensity value of the light sources 18 makes it possible to obtain all desired colour shades.

Figure 6:
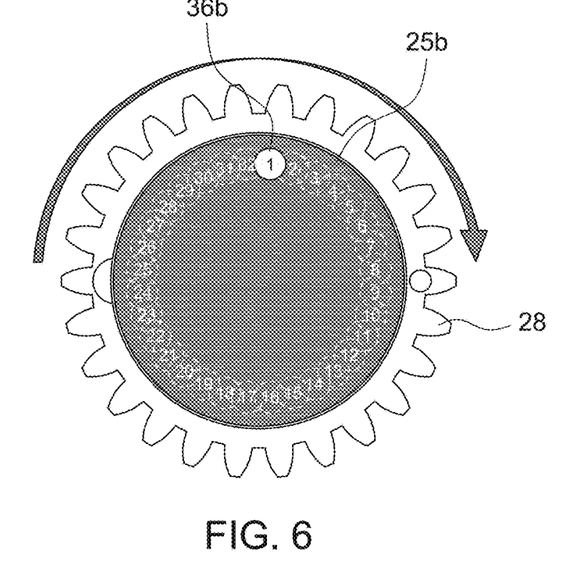
FIG. 6 is a schematic view of an additional detail of the light fixture in FIG. 1.
Figure 7A:
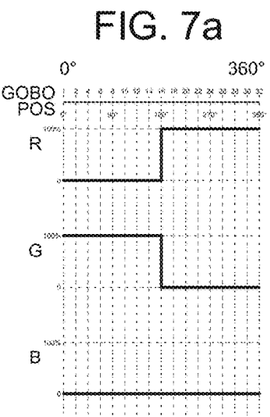
FIGS. 7a, 7b, 7c, 7d show schematic diagrams relating to the trend of certain variables in additional respective different operating configurations of the light fixture.
Figure 7B:
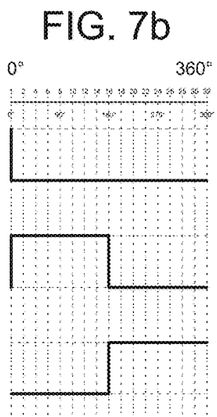
Figure 7C:
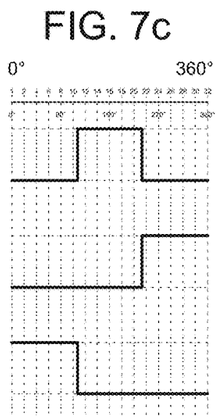
Figure 7D:
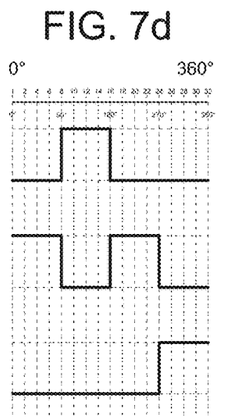
Figure 8A:
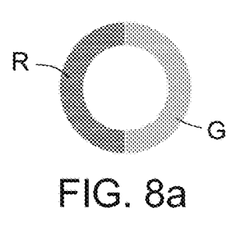
FIGS. 8a, 8b, 8c, 8d schematically show the projections of the light beam emitted by the light fixture in additional operating configurations of FIGS. 7a, 7b, 7c and 7d, respectively.
Figure 8B:
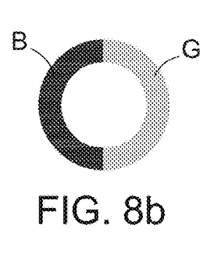
Figure 8C:
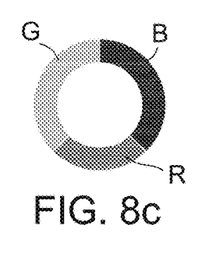
Figure 8D:
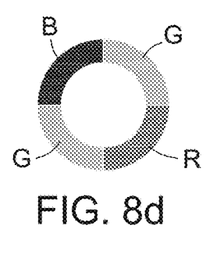

FIG. 6 shows a gobo 25b coupled to the respective gobos support 28. In the gobo 25b, a circular shape 36b has been made.

The dashed lines represent the angular positions that the gobos 25b and the respective shape 36b can assume, in use.

FIGS. 7a, 7b, 7c, 7d show on the same graph three diagrams respectively related to the trend of the light intensity signal of the red source (R), the green source (G), and the blue source (B) in relation to the angular position of the gobo 25b in FIG. 6.

The adjustments shown in FIGS. 7a, 7b, 7c, 7d determine the projection of a light beam in the shape of a circular crown, wherein there are sectors of different colours.

Also in this case the rotation speed of the gobo 25b is such that the rotation of the gobo 25b itself is not perceptible to the human eye. The rotation speed of the gobo 25b is higher than 25 rps (1500 rpm). In the non-limiting example described and shown herein, the rotation speed of the gobo 25b is 33.3 rps (2000 rpm).

FIGS. 4a-4d, 5a-5d, 7a-7d, and 8a-8d show only a few examples that can be obtained by adjusting the light intensity of the light sources 18 on the basis of the position of the gobo 25 that the light beam, in use, passes through.

The form of the beam obtained depends on the shape made on the gobo 25, while the colours and sizes of the sectors of the beam depend on the adjustment of the light intensity of each light source according to the angular position of the gobo 25 that the light beam passes through.

It is also possible to project images, in which the movement of one or more coloured sectors is perceptible, by means of an adjustment of the light intensity that varies with each turn made by the gobo 25 that the light beam passes through.

It is also possible to obtain the projection of an image in which a gradual change in colour, or a change in colours with a "rainbow" effect, is perceptible.

Thanks to the adjustment of the light intensity of the sources 18, on the basis of the position of the beam processing element 21 intercepting the light beam emitted by light source assembly 10, it is possible to obtain innovative scenographic effects that cannot be obtained with light fixtures of the known art.

In particular, the adjustment of the light intensity of the light sources 18 makes it possible to obtain numerous combinations of static or moving multi-colour images on the basis of the angular position of the gobo that intercepts the light beam. In other words, light fixture has a very high degree of flexibility and can meet the most diverse requirements in terms of scenographic effects.

Lastly, it is clear that modifications and variations may be made to the light fixture and method described herein without departing from the scope of the appended claims.

The invention claimed is:

1. A light fixture comprising:
    a light source assembly comprising at least two light sources, which are configured to generate visible light radiation of different colours;
    an optical device configured to process at least a portion of the light radiation emitted by the light source assembly so as to form a light beam extending substantially along an optical axis;
    at least one beam processing element located downstream of the optical device and configured to selectively intercept the light beam; wherein the at least one beam processing element comprises at least one disc configured to rotate about a first axis of rotation; wherein the at least one disc comprises one or more smaller discs arranged on the at least one disc; wherein each smaller disc of the one or more smaller discs is configured to rotate about a second axis of rotation different from the first axis of rotation;
    a control device configured to control the activation of each of the at least two light sources based on an angular position of the one or more smaller discs arranged on the at least one disc of the at least one beam processing element.

2. The light fixture according to claim 1, further comprising at least one step motor configured to move the one or more smaller discs arranged on the at least one disc of the at least one beam processing element; wherein the control device is configured to control the light source assembly based on an angular position of the at least one step motor.

3. The light fixture according to claim 1, wherein the control device is configured to control the intensity of the light radiation emitted by each light source of the at least two light sources.

4. The light fixture according to claim 1, wherein the at least one beam processing element is a gobos device.

5. The light fixture according to claim 4, wherein the disc rotating around a first axis of rotation is a gobos-holder disc.

6. The light fixture according to claim 4, wherein the one or more smaller discs is a gobo.

7. The light fixture according to claim 1, wherein the one or more smaller discs is configured to rotate about the second axis of rotation at a speed of at least twenty-five rotations per second.

8. A method for operating a light fixture provided with a light source assembly comprising at least two light sources, which are configured to generate visible light radiation of different colours, with an optical device configured to process at least a portion of the light radiation emitted by the light source assembly so as to form a light beam extending substantially along an optical axis, and with at least one beam processing element located downstream of the optical device and configured to selectively intercept the light beam; wherein the at least one beam processing element comprises at least one disc configured to rotate about a first axis of rotation; wherein the at least one disc comprises one or more smaller discs arranged on the at least one disc; wherein each smaller disc of the one or more smaller discs is configured to rotate about a second axis of rotation different from the first axis of rotation; wherein the method comprises:
    controlling the activation of each of the at least two light sources based on an angular position of the one or more smaller discs arranged on the at least one disc of the at least one beam processing element.

9. The method according to claim 8, wherein the light fixture further comprises at least one step motor configured to move the one or more smaller disks arranged on the at least one disc of the at least one beam processing element; wherein controlling the light source assembly occurs based on an angular position of the at least one step motor.

10. The method according to claim 8, wherein controlling the activation of each of the at least two light sources comprises controlling the intensity of the light radiation emitted by each light source of the at least two light sources.

11. The method according to claim 8, wherein the at least one beam processing element is a gobos device.

12. A computer program configured to perform the method as claimed in claim claim 8.

13. A non-transitory computer readable medium having stored thereon instructions that, when executed by a processor, cause the processor to perform the method as claimed in claim 8.

14. The method according to claim 8, wherein the one or more smaller discs is configured to rotate about the second axis of rotation at a speed of at least twenty-five rotations per second.

* * * * *